(12) United States Patent
Kim (10) Patent No.: US 7,001,493 B1
(45) Date of Patent: Feb. 21, 2006

(54) APPARATUS FOR PREPARING STERILIZING WATER AND PROCESS FOR STERILIZING WATER

(75) Inventor: Hee Jung Kim, Seoul (KR)

(73) Assignee: Kyungwon Enterprises Co., Ltd., Seoul (KR)

( * ) Notice: Subject to any disclaimer, the term of this patent is extended or adjusted under 35 U.S.C. 154(b) by 0 days.

(21) Appl. No.: 10/069,783

(22) PCT Filed: Sep. 3, 1999

(86) PCT No.: PCT/KR99/00509

§ 371 (c)(1),
(2), (4) Date: Jul. 22, 2002

(87) PCT Pub. No.: WO01/17909

PCT Pub. Date: Mar. 15, 2001

(51) Int. Cl.
*C25B 1/04* (2006.01)
*C25B 1/06* (2006.01)
*C25B 1/02* (2006.01)

(52) U.S. Cl. ............... 204/252; 204/244; 204/253; 204/288.1; 204/257; 204/263; 204/255; 205/788

(58) Field of Classification Search ........ 204/255–257, 204/263–266, 290.01, 292, 293, 252, 288.1, 204/244; 205/788

See application file for complete search history.

(56) References Cited

U.S. PATENT DOCUMENTS

| | | | |
|---|---|---|---|
| 4,197,178 A * | 4/1980 | Pellegri et al. ............. 204/255 |
| 4,371,433 A * | 2/1983 | Balko et al. ............. 204/230.2 |
| 4,571,288 A * | 2/1986 | Boulton ...................... 205/511 |
| 4,589,968 A | 5/1986 | Toomey, Jr. | |
| 4,648,953 A * | 3/1987 | Wardle et al. ............. 204/237 |
| 4,729,822 A * | 3/1988 | James ........................ 204/255 |
| 5,322,604 A | 6/1994 | Cawlfield | |
| 5,474,662 A * | 12/1995 | Miyamae .................... 204/257 |
| 5,615,764 A | 4/1997 | Satoh | |

FOREIGN PATENT DOCUMENTS

| EP | 0 601 284 | 6/1994 |
|---|---|---|
| JP | 09-262583 | 10/1997 |

* cited by examiner

*Primary Examiner*—Roy King
*Assistant Examiner*—Lois L Zheng
(74) *Attorney, Agent, or Firm*—Nath & Associates PLLC; Gregory B. Kang; Teresa M. Arroyo (57) ABSTRACT

The present invention provides an apparatus for preparing sterilizing water, which comprises an electrolyzer wherein an anode chamber (10) and a cathode chamber (20) partitioned by an ion exchange membrane (40) form a unit cell (A), being alternately arranged and successively equipped with close relation; water inlets (61, 62) and water outlets (71, 72) are provided on the end plate (60, 70) at both ends of the electrolyzer; said anode chamber (10) and cathode chamber (20) having circulative openings at the vicinity of each edge at both sides centered from anode plate (11) and cathode plate (21), of which two circulative openings of diagonal direction among them have plural passages of fan-shape, in order for water introduced through the openings to pass through the passages to rapidly go through each electrode; and a gap-control gasket (30) and a gasket for preventing leakage of electrolyte (31) having plural horizontal members are provided at the center to form an anode reaction chamber (13) and a cathode reaction chamber (23).

7 Claims, 4 Drawing Sheets

APPARATUS FOR PREPARING STERILIZING WATER AND PROCESS FOR STERILIZING WATER

TECHNICAL FIELD

The present invention relates to an apparatus for making water sterilized, which can sterilize various microorganisms living upon the living environment, by electrolysis of water, and a process of the sterilization.

BACKGROUND ART

Up to the present, disinfectants such as hydrogen peroxide, povidone iodine solution and phenol for preventing infection in a hospital, sodium hypochlorite (NaOCl) for sterilization of food and kitchen, alcoholic cleaners and agricultural chemicals commonly used in the field of agriculture, have been used.

However, using these chemicals involves problem of occurrence of transformed resistant bacteria upon the increased use of the amount, and causes problems of environmental pollution and treatment of waste water. In addition, these chemicals have serious problems in safety because they may cause allergy or skin irritation and even death when inhaled in a large amount.

DISCLOSURE OF THE INVENTION

Thus, the present invention provides a series of electrolyzers which comprises unit cells consisting of anode and cathode chambers having anode and cathode plates at the center of gaskets having plural horizontal members and plural anode and cathode passages of fan-shape, said anode and cathode chambers being partitioned by ion exchange membrane, to electrolyze water with an electric current of 100 A or less, and electric potential of 100 V or less. According to the invention, an apparatus to prepare water for sterilizing various kinds of microorganisms with pH 2.0 to 3.5 and redox potential of 950 to 1,200, and a process for the sterilization are provided.

BEST MODE FOR CARRYING OUT THE INVENTION

The electrolyzer according to the present invention comprises anode chambers (10) and cathode chambers (20) partitioned by ion exchange membrane (40). The anode chamber (10) and cathode chamber (20) form a unit cell (A), and the unit cells are alternately arranged with a close contact. At both sides of the electrolyzer, end plates (60 and 70) having water inlets (61, 61') and water outlets (71, 71'), respectively, are provided to form an outlined construction of the electrolyzer.

As described above, on the end plates (60 and 70), a couple of water inlets (61,62) and a couple of water outlets (71,72) are formed, and water being introduced from one water inlet (61) flows through the anode chamber (10) to be discharged as acidic water at one water outlet (71), while water being introduced from the other water inlet (62) flows through the cathode chamber (20) to be discharged from the other water outlet (72) as alkaline water.

Each anode chamber (10) and cathode chamber (20) commonly comprises a gap-control gasket (30) and a gasket for preventing leakage of electrolyte (31) at both sides of anode plate (11) and cathode plate (21), respectively to form a unit cell. In each gasket (30, 31), an anode passage (12) and a cathode passage (22) are respectively formed in a diagonal direction, which leads to an anode reaction chamber (13) or a cathode reaction chamber (23).

Figure 1:
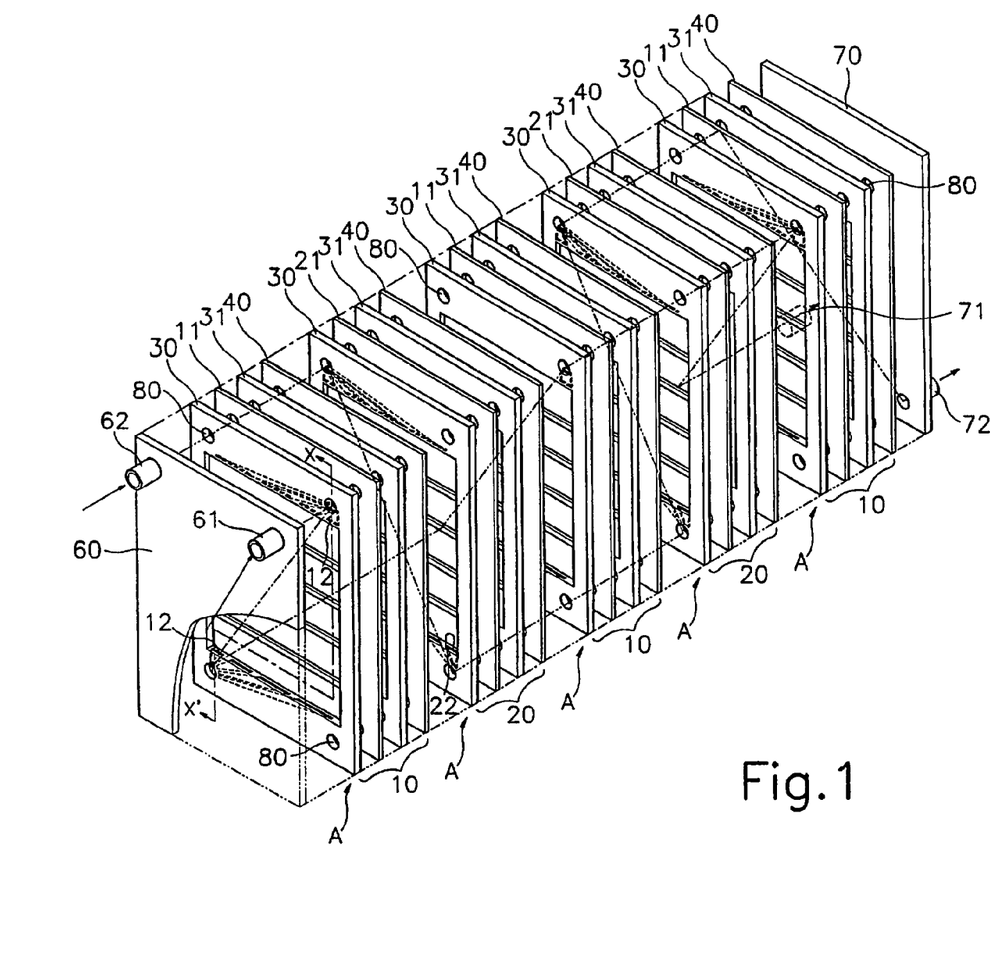
FIG. 1 is a divisional perspective view of the apparatus according to the present invention, which shows the flow of water.
Figure 2:
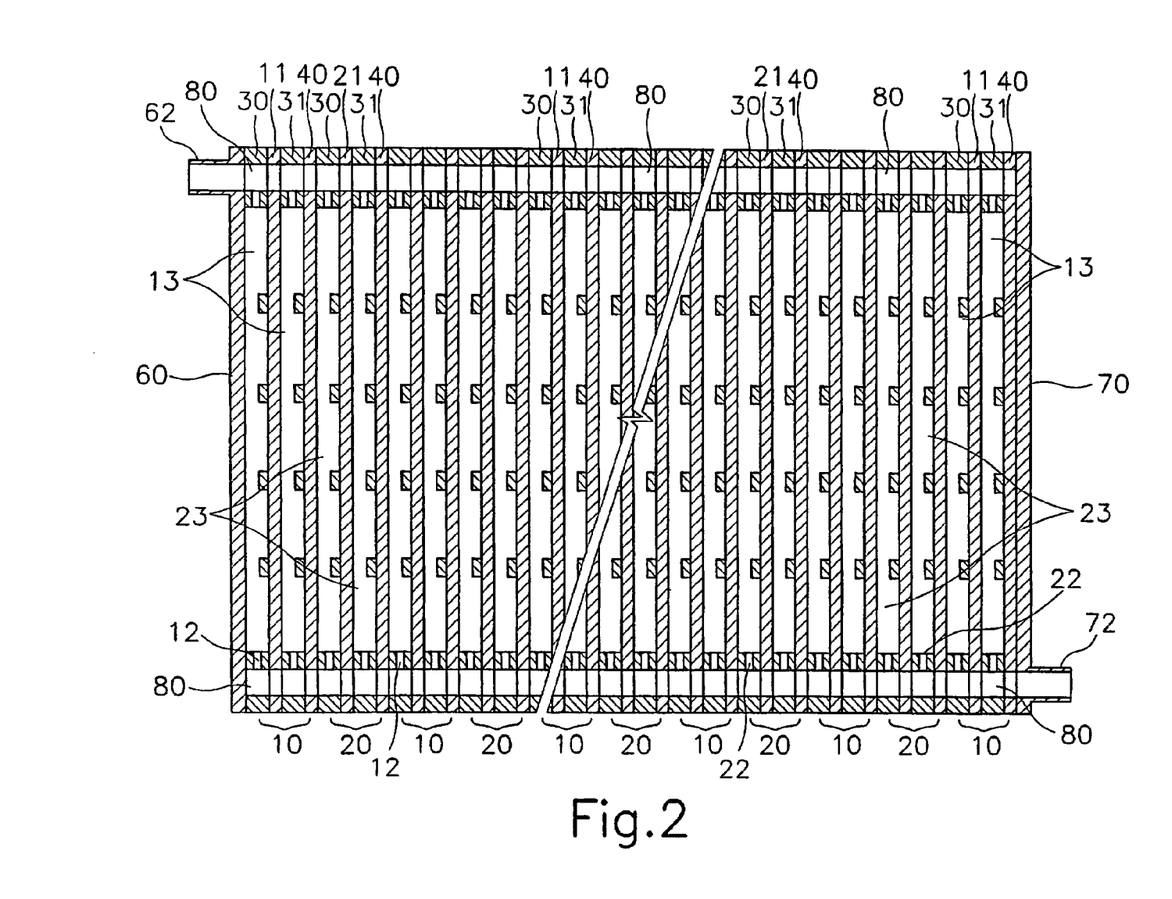
FIG. 2 is a sectional view of the assembled structure of the apparatus according to the present invention.
Figure 3:
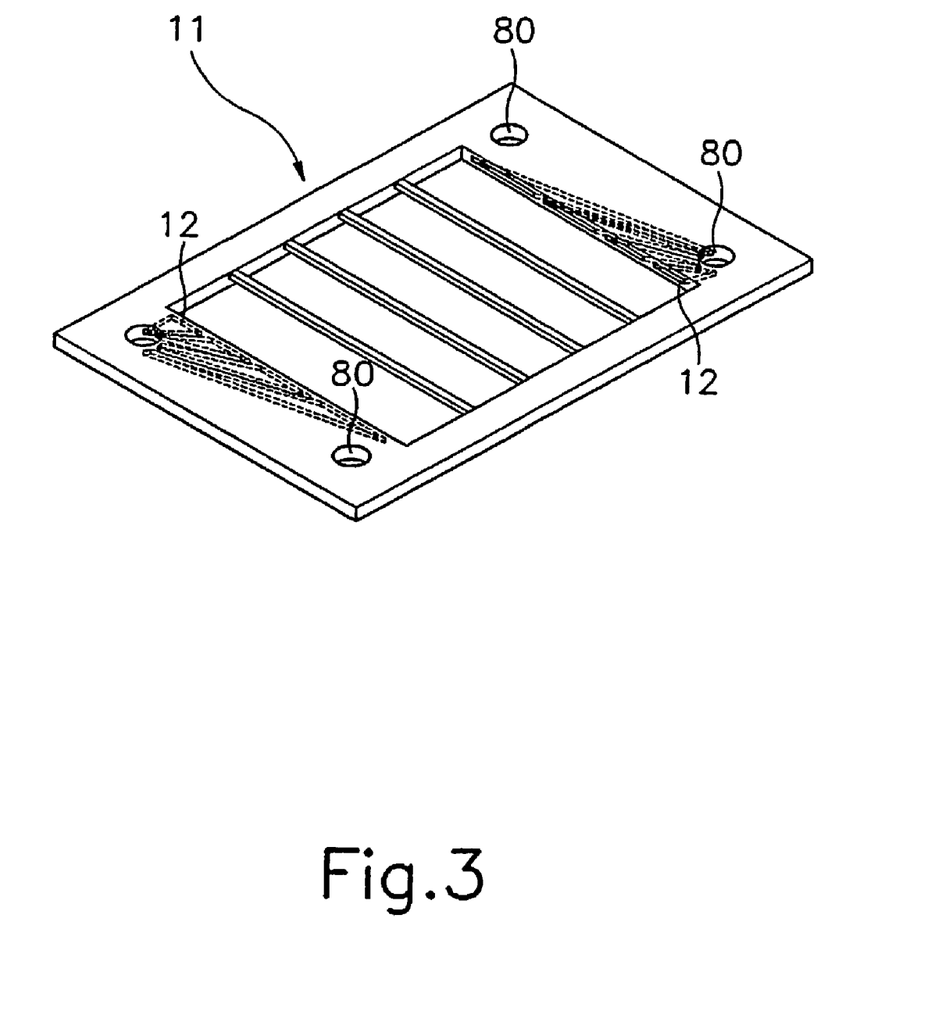
FIG. 3 is an extracted perspective view of the apparatus according to the present invention.

The structure of each electrode plate (11,21) and gasket (30, 31) used in the apparatus for preparing sterilizing water according to the present invention is examined. As illustrated in FIG. 3, circulatory openings are provided on each edge to pass the water that has been introduced through the water inlet (61,62). Plural passages of fan-shape are formed in two openings among them in a diagonal direction, so that water introduced through the circulatory opening may pass out through the passage, and then rapidly pass through each electrode to facilitate electrolytic reaction. Number of the plural passages formed in the circulatory openings are preferably three or more, and more preferably 4. In addition, at the center of gaskets (30, 31), plural horizontal members are provided to prevent deterioration of electrolytic power owing to the contact of ion exchange membrane with the electrode.

According to conventional electrolysis, the life of ion exchange membrane is short because Ca or Mg precipitate produced as a reaction side product is concentratedly deposited on the narrow surface of the membrane when it passes through the narrow passage. However, the apparatus according to the present invention provides a wide passage of fan-shape as illustrated in FIG. 3, so that the precipitate may passes through the ion exchange membrane by smoothly passing the passage, thereby preventing the deterioration of ion exchange membrane. Due to the structure of wide passage of fan-shape, discharge of gas generated from electrolysis is promoted to increase the efficiency of electrolysis, and the lifetime of electrodes become longer.

Since each anode or cathode passage (12, 22) of the anode chamber (10) and cathode chamber (20) is only formed in an opposite diagonal direction, the water introduced from one water inlet (61) moves through each circulatory opening (80) of the anode chamber (10) and then flows into the anode reaction chamber (13) through the anode passage (12) formed in each gasket (30,31) in the anode chamber (10), while the water introduced from the other water inlet (62) simply passes through the corresponding opening (80) in which no anode chamber passage (12) has been formed in the unit cell (A) of the anode chamber (10) to reach the cathode chamber (20), where the water discharged from the cathode passage (22) formed in each gasket (30,31) of the cathode chamber (20) flows into the cathode reaction chamber (23). In other words, the water introduced into the anode chamber (10) flows only into the anode reaction chamber to be reacted and then passes through the opening (80) to flow into only the anode chamber (10) of the next unit cell (A), while the water introduced into the cathode chamber (20)

flows only into the cathode reaction chamber (23) to be reacted and then repeatedly flows into the cathode chamber (20) of the next unit cell (A).

Now, the operative process of the present invention is described in detail.

When water is introduced into the electrolyzer through the water inlet (61,62), it is discharged through the upper anode passage (12) formed in the gasket (30, 31) from the first anode chamber (10), upon flowing into the electrolyzer through the circulatory opening (80). The discharged water flows down with the anode plate in contact (11), so that the water loses electrons by electrolytic reaction in the anode reaction chamber (13) to become acidic. The water passes through the lower anode chamber passage (12) while it is electrolyzed, and passes through the opening (80) to simply pass through the next cathode chamber (20). When the water reaches the unit cell (A) of the anode chamber (10) again, the water is discharged through the lower passage (12) of each gasket (30, 31), and then passes again through the upper passage (12), and further electrolyzed by contacting with the anode plate (11) in the anode reaction chamber (13) to become more acidic.

Meanwhile, the water introduced through the other water inlet (62) simply passes through the unit cell (A) of the first anode chamber (10) via the circulatory opening (80) to reach the cathode chamber (20) and then discharged through the upper cathode passage (22) formed in each gasket (30, 31) of the cathode chamber. Then, the water flows down with the cathode plate in contact (21) in the cathode reaction chamber (23) to gain a large amount of electrons by electrolysis and becomes alkaline.

The water reacted as described above is discharged via the lower cathode passage (22) to pass through the opening (80) and then flows into the cathode reaction chamber (23) via the cathode passage (22) of the cathode chamber (20) to be subjected to the repeated operation of electrolysis.

In the anode chamber (10), oxygen, hydrogen ion and oxygen radical are generated by oxidation of water to give acidic water.

$$2H_2O \longrightarrow O_2 + 4H^+ + 4e^-$$

At this time, oxygen ($O_2$) is dispersed into the air to increase the concentration of hydrogen ion in the anode chamber to raise pH and the redox potential.

Meanwhile, the substances in molecular state, such as oxygen, carbon dioxide and calcium carbonate and the anions such as chloride ion or bicarbonate ion, which are contained in piped or underground water, are reacted as follows to give ozone, superoxide anion, hydrogen peroxide and hypochlorous acid.

$$O_2 + H_2O \longrightarrow 2H^+ + e^- + O_3$$

$$O_2 + e^- \longrightarrow O_2^-$$

$$2H^+ + O_2^- \longrightarrow H_2O_2$$

$$2Cl^- + O_3 + 2H^+ \longrightarrow Cl_2 + O_2 + H_2O$$

$$2Cl^- \longrightarrow Cl_2 + 2e^-$$

$$Cl_2 + H_2O \longrightarrow H+ Cl + HClO$$

On the other hand, in the cathode chamber (20), hydrogen and hydroxide ion are generated by reduction of water as follows to give alkaline water.

$$2H_2O + 2e^- \longrightarrow H_2 + 2OH^-$$

The method for preparing acidic water and alkaline water by means of electrolysis of water using anode and cathode has been generally used.

However, the present invention provides more effective apparatus for preparing acidic and alkaline water by using such anode and cathode chambers, and further provides a structural apparatus to produce sterilizing water with excellent sterilizing effect in a large scale.

According to the present invention, the anode plate (11) and the cathode plate (21) use proper catalysts to promote the reaction of the anode chamber and reaction of the cathode chamber respectively.

The anode plate (11) generally employs a dimension stable anode (DSA) using oxides of iridium or ruthenium as an oxygen-generating catalyst or platinum plating on titanium substrate.

The cathode plate (21) employs hydrogen or oxygen generating catalyst (such as oxides of iridium or ruthenium) in addition to stainless steal, nickel, mild steel or titanium substrate.

The ion exchange membrane (40) comprises of fluororesin or hydrocarbon type ion exchange membrane. According to the present invention, the electrolytic potential is lowered by using Sn-Ir-Pt complex electrode having low hydrogen generation potential, while the gap-control gaskets (30) which adjust the distance between the electrodes are provided with a thickness of 2 mm or less, considering the potential between an electrode and the other.

Further, the material for the gap-control gaskets (30) and gaskets for preventing leakage of electrolytes (31) is generally selected from EDPM rubber, silicone, teflon, and the like.

The unit cell (A) of the present invention is set in a housing frame and is tightly assembled by using nuts and bolts. All anodes and cathodes of the present invention are electrically connected to the positive and negative terminals of a current supply source, while the outlet for the acidic water has a sensor for detecting the redox potential so that it may continuously measure the value to control the potential of a rectifier using a controller or to control the acidity using a flow controller.

According to the present invention, the electric current is set to a level of not higher than 100 A, while the voltage is set to a level of not higher than 100 V, depending upon the flow rate of water supplied to the electrolyzer. The system is evaluated by measuring electric potential and pH by the lapse of time so as to obtain acidic water of high quality.

The acidic water electrolyzed via the electrolyzer according to the present invention has pH of 2.0 to 3.5 and very high redox potential of 950 to 1,200 mV. That is, the acidic water has strong sterilizing action, since it has such a low electron concentration that takes the electrons of bacterial cells instantly to break the cell membrane and extinguish bacteria.

The sterilizing water prepared according to the present invention is generated from an apparatus for preparing electrolyzed water, which is divided into anode and cathode chamber. The acidic water in the anode comprises superoxide ($O_2^-$), hydrogen peroxide, ozone, hypochlorous acid, or the like, having strong oxidizing ability which oxidizes or denaturalizes the amino acid group on the surface of bacteria or fungi harmful to a human body or environment. Thus, the water has strong sterilizing power to extinguish the harmful bacteria in 5 to 30 seconds.

Accordingly, the apparatus for preparing sterilizing water according to the present invention can be used for preventing harmful insects, for sterilization and cleaning of various agricultural and stockbreeding products in the field of agriculture and stockbreeding, as well as cleaning of devices or human body to prevent infection in the field of medical treatment. Further, the apparatus can be widely used for various applications, for example, sterilizing or controlling sanitary condition in food processing industries, restaurants, hotels or houses.

In the apparatus for electrolyzing water according to the present invention, depolarized ion exchange membrane (40) is provided to prevent hydrogen ion generated in the anode chamber (10) from being moved into the cathode chamber (20), while preventing hydroxyl ion generated in the cathode chamber (20) from being moved into the anode chamber (10) to maximize the productivity of water.

The ion exchange membranes (40) usable in the electrolytic system according to the present invention include commercially available ion exchange membranes such as fluoride or hydrocarbon type ion exchange membrane merchandised by Dupont Co. of U.S.A., Asahi Chemical Co. or Asahi Glass Co. of Japan, or depolarized ion exchange membranes comprising integrated anion and cation exchange membrane manufactured by Dokuyama Soda Co. of Japan.

The invention is described in more detail by referring to the examples below, but it should be noticed that the present invention is not restricted to the examples by any means.

EXAMPLE 1

Tap water is supplied into an electolyzer according to the present invention at a flow rate of 10 liter per minute, and the current is constantly supplied as 50 A. Electric potential and pH are measured with the lapse of time to evaluate the system and to prepare acidic water. The physicochemical properties of sterilizing water finally obtained by the apparatus according to the present invention were compared with conventional piped water, and the results are shown in Table 1.

Table 1. Physicochemical Properties of the Sterilizing Water of the Present Invention

|  | Sterilizing water of the present invention | Tap water |
| --- | --- | --- |
| PH | 2.0–3.5 | 6.8–7.7 |
| Redox potential (mV) | 950–1,200 | 350–550 |
| Conductivity (μs/cm) | 1.7 | 1.4 |
| $^{17}$O-NMR half-width (Hz) | 55–65 | 140–150 |

EXAMPLE 2

Test for Sterilizing Ability (1) Preparation of Inoculation Source

The test sample at the contact time "0" and the control sample were properly diluted with beef broth culture medium after 24 hour cultivation to make the regenerated bacterial number 1–2×10$^6$, and the resultant bacterial solution 1 ml was used as an inoculation source. For the dilution of the culture medium, physiological saline was used.

(2) Preparation of Test Sample and Control Sample

In an 237 ml of wide neck glass container having a screw-type lid, test sample and control sample were prepared respectively. For the control sample, the same amount of phosphoric buffer solution without containing the test sample was placed. The control sample inoculated with bacteria was used as a control means against the inoculated test sample.

(3) Inoculation and Cultivation of Test Sample and Control Sample

Bacteria cultivated for 24 hours was shaken and stood for 15 minutes before preparing the inoculation source. Then, 1 ml of the inoculation source was carefully dropped on the test sample and control sample to be evenly dispersed.

Phosphoric buffer solution (pH 7.2) was added as a neutralizing solution to each glass vessel containing inoculated control sample and glass vessel containing inoculated test sample soon after inoculation (within 30 seconds). The sample was diluted, and a portion was taken and inoculated by thinly spreading it on a plate medium containing agar and tryptophan glucose extract. The inoculated samples were cultivated in a plate cultivator at 37° C. for 48 hours, and the number of bacteria was counted.

The results are shown in Table 2.

Table 2: Sterilizing Power of the Sterilizing Water of the Present Invention

|  | Control sample (5 min) | No. of bacteria after treating with sterilizing water of the invention for 30 seconds (cfu/ml) | Sterilizing power (%) |
| --- | --- | --- | --- |
| E. coli O-157 | 3.6 × 10$^3$ | 0 | 99.9 |
| Salmonella typhimurium | 3.2 × 10$^3$ | 0 | 99.9 |
| Bacillus subtilis | 2.0 × 10$^3$ | 0 | 99.9 |
| Enterobactor cloacae | 3.0 × 10$^3$ | 0 | 99.9 |
| Klabsiella pneumoniae | 3.3 × 10$^3$ | 0 | 99.9 |
| Shigella flexneri | 3.6 × 10$^3$ | 0 | 99.9 |
| Candida albicans | 2.6 × 10$^3$ | 0 | 99.9 |
| Trichophyton rubrum | 2.6 × 10$^3$ | 0 | 99.9 |
| Aspergillus niger | 2.2 × 10$^3$ | 0 | 99.9 |
| Penicillium funiculosum | 3.2 × 10$^3$ | 0 | 99.9 |
| Valsa ceratosperma | 3.8 × 10$^3$ | 0 | 99.9 |

As can be seen from the results of Table 2, it was confirmed that sterilizing water prepared from the apparatus for preparing sterilizing water according to the present invention has an excellent sterilizing power against bacteria causing food poisoning or pathogenic infections and fungi causing sanitary or infectious problems in the environment or daily commodities.

EXAMPLE 3

Effect of Preventing Agricultural Diseases (1) Preparation of Inoculation Source Each sample infected with red pepper white powder disease, cucumber bacterial disease, cucumber white powder disease, grape bacterial disease, strawberry white powder disease, bacterial brown spot of agaric and green mold disease was taken, and the infectious bacteria was isolated.

The isolated strain was cultivated in nutrient agar medium at 25° C. The concentration of living bacteria was measured by subsequent dilution of the cultured bacteria.

(2) Inoculation of the Cultured Bacteria and Measurement of Number of Living Bacteria Sterilizing water (9.9 ml) prepared according to Example 1 of the present invention was charged in a test tube, and each 0.1 ml of bacteria at a concentration of $10^{10}$/ml was inoculated, and the mixture was reacted for 30 seconds. The reaction mixture (0.1 ml) was inoculated on nutrient agar medium (which had been previously prepared), and cultivated at 25° C. for 24 hours. The number of colonies generated was counted to determine the extinction rate. For the control group, identical experiments were repeated by using commercially available agricultural chemicals.

The results are shown in Table 3 below.

Table 3. Effect of Preventing Agricultural Diseases

|  | Prevention (%) | | |
| --- | --- | --- | --- |
|  | Sterilizing water of the invention | Commercially available agricultural chemicals | No treatment |
| red pepper white powder disease | 67.8 | 51.0 | 0 |
| Cucumber bacterial disease | 21.4 | 17.7 | 0 |
| Cucumber white powder disease | 77.9 | 66.1 | 0 |
| grape bacterial disease | 90.8 | 91.7 | 0 |
| Strawberry white powder disease | 76.8 | 78.4 | 0 |
| Agaric |  |  |  |
| Bacterial brown spots | 72.8 | — | 0 |
| Green mold disease | 90.7 | — | 0 |

As seen in the results of Table 3, sterilizing water prepared by the apparatus according to the present invention has an effect for preventing agricultural diseases, and the effect is more excellent than that of commercially available agricultural chemicals.

EXAMPLE 4

Sterilizing Effect when Washing Hands

After applying *E. coli* on a hand, the hand was washed by being soaked in 5 liter of the sample. Then, four fingers were rubbed on a medium to measure the number of remained bacteria. For the control, Super-Sterilizer and Alpet-E (commercially available hand sterilizers) were used. Identical tests were repeated six times, and the mean values are shown in Table 4 below.

Table 4: Sterilizing Effect when Washing Hands

|  | No. of remaining bacteria after washing | Reduction rate of bacteria (%) |
| --- | --- | --- |
| Untreated group | $1.0 \times 10^5$ | — |
| Super-Sterilizer | $1.5 \times 10^2$ | 99.8 |
| Alpet-E | $4.9 \times 10^2$ | 99.5 |
| Sterilizing water of the invention | 3 | 99.9 |

As shown in the results of Table 4, the sterilizing water prepared by the apparatus of the present invention has an excellent sterilizing effect as compared with commercially available sterilizers for washing hands and thus can be employed as a sterilizer for medical use.

EXAMPLE 5

Test of Toxicity (1) Test for Acute Toxicity

A test for acute toxicity of the sterilizing water prepared according to Example 1 was performed by using 5 weeks-old ICR mouse having a body weight of 20±3 g. As a critical test, 5000 mg/kg of sterilizing water was administered, and the concentration was adjusted to 500 mg/ml. The sample was orally administered once at a rate of 1 ml/100 g. For a negative control, the sterilized physiological saline was administered.

For 6 hours after administration, the animals were observed every hour. Then, activity, appearance and symptoms related to autonomic nerves of the mice were carefully observed once a day during 14 days thereafter. A body weight of each animal was measured on the day of administration and 5 days after the administration, and compared with that of the control group. No extraordinary change was found.

(2) Test of Eye Irritation

A test of eye irritation by sterilizing water prepared from Example 1 of the present invention was performed by using 3–4 months-old New Zealand white rabbits, each having a body weight of 2.0 to 3.0 kg. Nine rabbits were selected, and 0.1 ml of sterilizing water prepared from Example 1 was administered dropwise on the eye membrane of right eye of each rabbit. After 30 seconds, both eyes of three among them were washed with sterile physiological saline for 1 minutes, while the eyes of remaining 6 rabbits were not washed. The left eye of each rabbit, with no administration of sample, was used as a control.

After administering sterilizing water, the rabbits were observed everyday in view of general symptoms and intake of food and water. The eye test was performed after 1, 24, 48, 72 and 96 hours, and seven days after administration of sterilizing water. On the basis of the table for judging the eye membrane irritation and table for grading pathological change of eyeballs according to "the Standard for Toxicity Test of Medicines or the like", Notification No. 94-3 by the National Health and Safety Institute, the pathological change of each eye was graded, and the state of irritation was evaluated.

As a result, it was confirmed that no substantial irritation was found on the eye membrane of the test rabbits.

EXAMPLE 6

Test of Durability

An apparatus for preparing sterilizing water equipped with the gasket according to the present invention and an apparatus for electrolysis employing a gasket having a single passage without a horizontal member instead of the gasket according to the invention, as a comparative example, were operated for about six months in an identical condition. After 6 month operation, the ion exchange membrane of each electrode was taken and photographed. (FIGS. 4A and 4B).

Figure 4A:
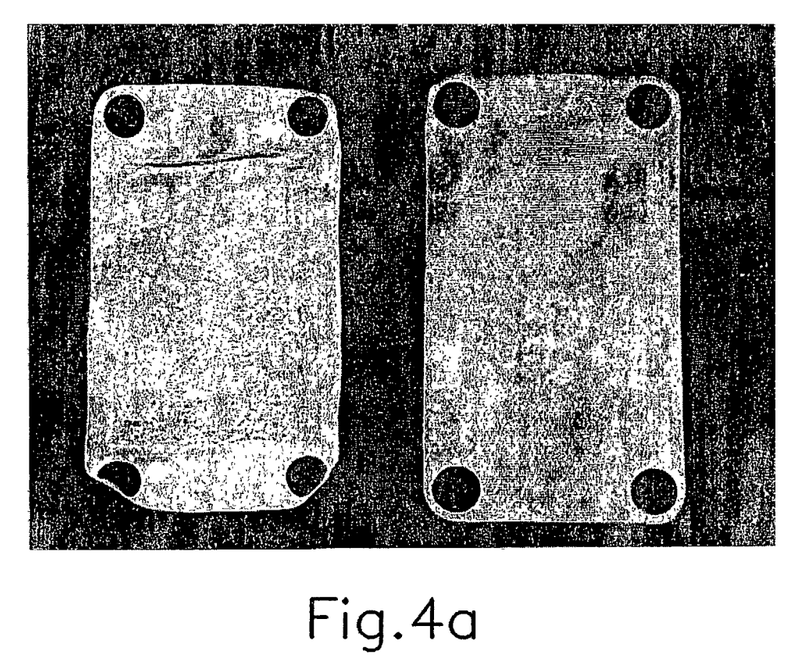
FIG. 4a is a photograph of ion exchange membranes which were used for the apparatus of the present invention (right) and for the conventional electrolyzer (left).
Figure 4B:
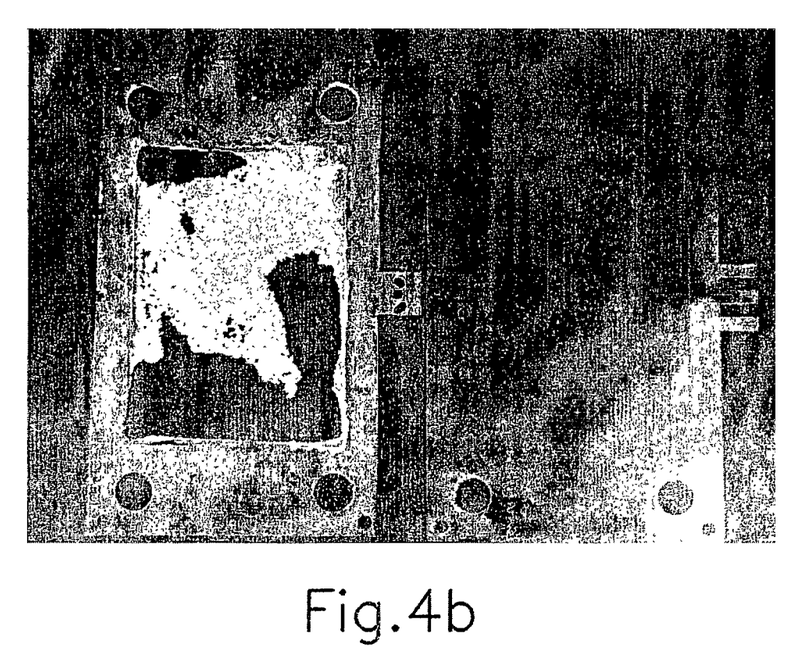
FIG. 4b is a photograph of electrodes which were used for the apparatus of the present invention (right) and for the conventional electrolyzer (left).

As seen in FIG. 4, in case of using a gasket of conventional structure, Ca or Mg precipitate generated as a side product of electrolysis was deposited on the ion exchange membrane (left of FIG. 4A) or the electrode (left of FIG. 4B), which could not be used further. On the other hand, the apparatus for preparing sterilizing water according to the present invention showed much less deposition of precipitate on the ion exchange membrane (right of FIG. 4A) and no deposition of precipitate at all on the electrode (right of FIG. 4B).

As described above, sterilizing water prepared with a very low electric potential according to the present invention shows an excellent sterilizing power against various microorganisms and thus can be advantageously used in the field of agriculture and medical treatment as well as everyday life. Sterilizing water prepared by the apparatus according to the present invention, though being consisting of pure water, shows an excellent sterilizing power, and thus it does not cause environmental pollution as compared to conventional chemical sterilizers, thereby contributing to environmental protection.

What is claimed is:

1. An apparatus for preparing sterilizing water comprising an electrolyzer:
    wherein an anode chamber (10) and a cathode chamber (20) partitioned by an ion exchange membrane (40) form unit cells (A), is located between said anode chamber (10) and said cathode chamber (20), said unit cells (A) being alternately arranged and brought into close contact with each other;
    end plates (60, 70) are placed at an outer surface of a first unit cell and a last unit cells respectively;
    water inlets (61, 62) and water outlets (71, 72) are attached to each of said end plates(60,70) of said electrolyzer;
    said anode chamber (10) includes an anode plate (11) and said cathode chamber (20) includes a cathode plate (21), said anode plate (11) and said cathode plate (21) have four circulative openings at each corner of which two circulative openings at diagonally opposite positions have fan-shaped plural passages (12, 22), in order for water introduced through the openings to flow through the passages to pass a surface of each anode plate (11) or cathode plate (21); and
    an anode reaction chamber (13) and a cathode reaction chamber (23) are formed by a gap-control gasket (30) and an electrolyte leakage prevention gasket (31) having plurality of horizontal members at a center region.

2. An apparatus for preparing sterilizing water according to claim 1, wherein an anode passage (12) and a cathode passage (22) formed in each gasket (30, 31) provide a path for the water from each water inlet (61, 62) to flow through the anode passage (12) and the cathode passage (22), respectively.

3. An apparatus for preparing sterilizing water according to claim 2, wherein the anode plate (11) is a dimension stable anode (DSA) using an oxygen-generating catalyst or platinum plating on titanium substrate.

4. An apparatus for preparing sterilizing water according to claim 2, wherein the cathode plate (21) is a hydrogen-generating catalyst on a stainless steel, nickel, mild steel or titanium substrate.

5. An apparatus for preparing sterilizing water according to claim 3, wherein the oxygen-generating catalyst is iridium or ruthenium.

6. An apparatus for preparing sterilizing water according to claim 4, wherein the hydrogen-generating catalyst is iridium or ruthenium.

7. An apparatus for preparing sterilizing water comprising an electrolyzer:
    said electrolyzer having a plurality of unit cells (A), each of said plurality of unit cells (A) including an anode chamber (10) and a cathode chamber (20), wherein an ion exchange membrane (40), is located between said anode chamber (10) and said cathode chamber (2%, said anode chamber (10) and said cathode chamber (20) being alternately arranged, and said plurality of unit cells (A) being in close contact with each other;
    said electrolyzer having end plates (60, 70) located at an outer surface of a first unit cell and a last unit cell, respectively;
    said electrolyzer having water inlets (61, 62) and water outlets (7 1, 72) attached to each of said end plates (60, 70),
    wherein said anode chamber (10) includes an anode plate (11) and said cathode chamber (20) includes a cathode plate (2 1), each of said anode plate (11) and said cathode plate (21) having at least one circulative opening at a corner thereof such that two circulative openings at diagonally opposite positions have a plurality of fan-shaped passages (12, 22) in order for water introduced through the openings to flow through the passages to pass a surface of each anode plate (11) or cathode plate (21); and
    wherein an anode reaction chamber (13) and a cathode reaction chamber (23) are formed by a gap-control gasket (30) and an electrolyte leakage prevention gasket (31) located in said anode chamber (10) and said cathode chamber (20), each gasket having plurality of horizontal members at a center region.

* * * * *

UNITED STATES PATENT AND TRADEMARK OFFICE
CERTIFICATE OF CORRECTION

PATENT NO. : 7,001,493 B1
DATED : February 21, 2006
INVENTOR(S) : Kim

It is certified that error appears in the above-identified patent and that said Letters Patent is hereby corrected as shown below:

<u>Column 10,</u>
Line 30, delete "(2%," and replace with -- (20) --.
Line 43, delete "(2 1)," and replace with -- (21), --.

Signed and Sealed this

Twenty-fifth Day of April, 2006

JON W. DUDAS
*Director of the United States Patent and Trademark Office*